US012637039B1

(12) United States Patent
Brinkman et al.

(10) Patent No.: US 12,637,039 B1
(45) Date of Patent: May 26, 2026

(54) SYSTEM AND METHOD FOR DETERMINING AN OPTIMAL TRAILER BRAKE CALIBRATION FOR A TRAILER BRAKE

(71) Applicant: GM Global Technology Operations LLC, Detroit, MI (US)

(72) Inventors: Todd Joseph Brinkman, Rochester Hills, MI (US); Zachary Lee Mesplay, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 61 days.

(21) Appl. No.: 18/958,305

(22) Filed: Nov. 25, 2024

(51) Int. Cl.
| | |
|---|---|
| *B60T 8/17* | (2006.01) |
| *B60T 8/172* | (2006.01) |
| *B60T 8/174* | (2006.01) |
| *B60T 8/58* | (2006.01) |

(52) U.S. Cl.
CPC ............ *B60T 8/1701* (2013.01); *B60T 8/172* (2013.01); *B60T 8/174* (2013.01); *B60T 8/58* (2013.01); *B60T 2250/04* (2013.01)

(58) Field of Classification Search
CPC ........ B60T 8/1701; B60T 8/172; B60T 8/174; B60T 8/58; B60T 2250/04
See application file for complete search history.

(56) References Cited

U.S. PATENT DOCUMENTS

| | | | | |
|---|---|---|---|---|
| 2018/0154874 A1* | 6/2018 | Kulkarni | ............... | B60T 8/1708 |
| 2018/0339685 A1* | 11/2018 | Hill | ....................... | B60T 13/662 |
| 2020/0282965 A1* | 9/2020 | Pieronek | ................. | H04L 12/40 |
| 2021/0139008 A1* | 5/2021 | DiGioacchino | ....... | B60T 8/1708 |
| 2022/0379853 A1* | 12/2022 | Goodarzi | .............. | B60T 13/662 |
| 2024/0400016 A1* | 12/2024 | Nguyen | .................... | B60T 7/20 |

FOREIGN PATENT DOCUMENTS

DE    102022108967 A1    12/2022

OTHER PUBLICATIONS

Nguyen, M., et al. U.S. Appl. No. 18/328,138, filed Jun. 2, 2023.
U.S. Appl. No. 18/328,138, filed Jun. 2, 2023.

* cited by examiner

*Primary Examiner* — Sizo B Vilakazi
(74) *Attorney, Agent, or Firm* — Vivacqua Crane, PLLC

(57) ABSTRACT

A method for determining an optimal trailer brake calibration for a trailer brake includes a user coasting a vehicle with a trailer attached that includes the trailer brake to a recommended speed, determining a coasting deceleration, pulsing the trailer brake, and then measuring a pulsing deceleration of the vehicle. When the pulsing deceleration is less than or equal to the coasting deceleration, a commanded activation energy of the trailer brake is increased, the pulsing deceleration of the vehicle is remeasured, and the pulsing deceleration is again compared to the coasting deceleration. When the pulsing deceleration is greater than the coasting deceleration, a minimum activation energy of the trailer brake is determined based on the commanded activation energy, the type of the trailer brake is identified, and the optimal trailer brake calibration is determined based on inputting the minimum activation energy into an algorithm.

20 Claims, 5 Drawing Sheets

SYSTEM AND METHOD FOR DETERMINING AN OPTIMAL TRAILER BRAKE CALIBRATION FOR A TRAILER BRAKE

INTRODUCTION

The present disclosure relates to a trailer brake, particularly with respect to determining a minimum activation energy of the trailer brake and using the minimum activation energy to determine an optimal trailer brake calibration for the trailer brake.

Trailer brakes assist a trailer attached to a vehicle in controlled braking, allowing the trailer to safely match the vehicle in coming to a stop, especially sudden stops or when driving downhill. There are different types of trailer brakes that are used to achieve this end, including electric trailer brakes and electric over hydraulic trailer brakes. Every trailer brake requires a particular amount of energy to initiate before they begin the braking process, called a minimum activation energy. Knowing the minimum activation energy of a trailer brake prevents a delay in trailer brake application.

Thus, while current trailer brakes achieve their intended purpose, there is a need for a new and improved system and method for optimizing trailer brake calibration for trailer brakes based on the minimum activation energy of the trailer brakes.

SUMMARY

According to several aspects, a method for determining an optimal trailer brake calibration for a trailer brake within a vehicle is provided. The method may include coasting the vehicle to a recommended speed. The method may further include measuring a coasting deceleration of the vehicle. The method may further include pulsing the trailer brake using a commanded activation energy. The method may further include measuring a pulsing deceleration of the vehicle. The method may further include comparing the coasting deceleration of the vehicle to the pulsing deceleration of the vehicle. The method may further include determining a minimum activation energy value of the trailer brake by discovering the commanded activation energy when the pulsing deceleration is greater than the coasting deceleration. The method may further include identifying a trailer brake type of the trailer brake based on a plurality of known minimum activation energies. The method may further include determining an optimal trailer brake calibration based on the minimum activation energy.

In an additional aspect of the present disclosure, the recommended speed is a speed of the vehicle in which it is deemed safe to pulse the trailer brake.

In another aspect of the present disclosure, the coasting deceleration is the deceleration of the vehicle that is measured when the vehicle is coasting from a recommended speed and the trailer brake is not pulsed.

In an additional aspect of the present disclosure, pulsing the trailer brake further includes pulsing the trailer brake at incremental levels of energy until the pulsing deceleration is greater than the coasting deceleration.

In another aspect of the present disclosure, the pulsing of the trailer brake is initiated by a controller within the vehicle.

In an additional aspect of the present disclosure, the pulsing deceleration is the deceleration of the vehicle that is measured when the trailer brake is pulsed.

In another aspect of the present disclosure, the commanded activation energy is the energy sent to the trailer brake and dictates the strength of the application of the trailer brake.

In an additional aspect of the present disclosure, the method may further include increasing the commanded activation energy of the trailer brake when the pulsing deceleration of the vehicle is less than or equal to the coasting deceleration of the vehicle.

In another aspect of the present disclosure, increasing the commanded activation energy may further include increasing the amount of energy sent to the trailer brake by a calibrated incremental margin.

In an additional aspect of the present disclosure, the minimum activation energy value is determined by discovering the value of the minimum commanded activation energy where the pulsing deceleration is greater than zero units per second squared.

In another aspect of the present disclosure, the optimal trailer brake calibration is based on the optimization of the minimum activation energy value by a machine learning algorithm.

In an additional aspect of the present disclosure, the type of the trailer brake type is identified by comparing the minimum activation energy to a plurality of known minimum activation energies, discovering a known minimum activation energy from the plurality of known minimum activation energies that matches the minimum activation energy, and determining the type of the trailer brake is the type of trailer brake associated with the matched known minimum activation energy.

In another aspect of the present disclosure, the plurality of known minimum activation energies is a list of already known minimum activation energies for various types of trailer brakes.

In an additional aspect of the present disclosure, the optimal trailer brake calibration and the type of the trailer brake is recorded in a trailer brake profile.

According to several aspects, a method for determining an optimal trailer brake calibration for a trailer brake within a vehicle is provided. The method may include coasting the vehicle to a recommended speed. The method may further include measuring a coasting deceleration of the vehicle. The method may further include pulsing the trailer brake using a commanded activation energy. The method may further include measuring a pulsing deceleration of the vehicle. The method may further include comparing the coasting deceleration of the vehicle to a pulsing deceleration of the vehicle. The method may further include determining a minimum activation energy value of the trailer brake by discovering the commanded activation energy when the pulsing deceleration is greater than the coasting deceleration. The method may further include identifying a trailer brake type of the trailer brake based on a plurality of known minimum activation energies. The method may further include recording the minimum activation energy value and the trailer brake type into a trailer profile. The method may further include determining an optimal trailer brake calibration based on the minimum activation energy.

In an additional aspect of the present disclosure, the method may further include increasing the commanded activation energy of the trailer brake when the pulsing deceleration of the vehicle is less than or equal to the coasting deceleration of the vehicle.

In another aspect of the present disclosure, the plurality of known minimum activation energies is a list of already known minimum activation energies for various types of trailer brakes.

In an additional aspect of the present disclosure, the trailer profile is recorded in a trailer profile database containing a plurality of trailer profiles.

In another aspect of the present disclosure, the optimal trailer brake calibration is automatically set when a driver selects the trailer profile when operating the vehicle.

According to several aspects, a method for determining an optimal trailer brake calibration for a trailer brake within a vehicle is provided. The method may include coasting the vehicle to a recommended speed. The method may further include measuring a coasting deceleration of the vehicle. The method may further include pulsing the trailer brake using a commanded activation energy. The method may further include measuring a pulsing deceleration of the vehicle. The method may further include comparing the coasting deceleration of the vehicle to a pulsing deceleration of the vehicle. The method may further include increasing the commanded activation energy of the trailer brake when the pulsing deceleration of the vehicle is less than or equal to the coasting deceleration of the vehicle. The method may further include determining a minimum activation energy value of the trailer brake by discovering the commanded activation energy when the pulsing deceleration is greater than the coasting deceleration. The method may further include identifying a trailer brake type of the trailer brake based on a plurality of known minimum activation energies. The method may further include recording the minimum activation energy value and the trailer brake type into a trailer profile. The method may further include determining an optimal trailer brake calibration based on the minimum activation energy.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
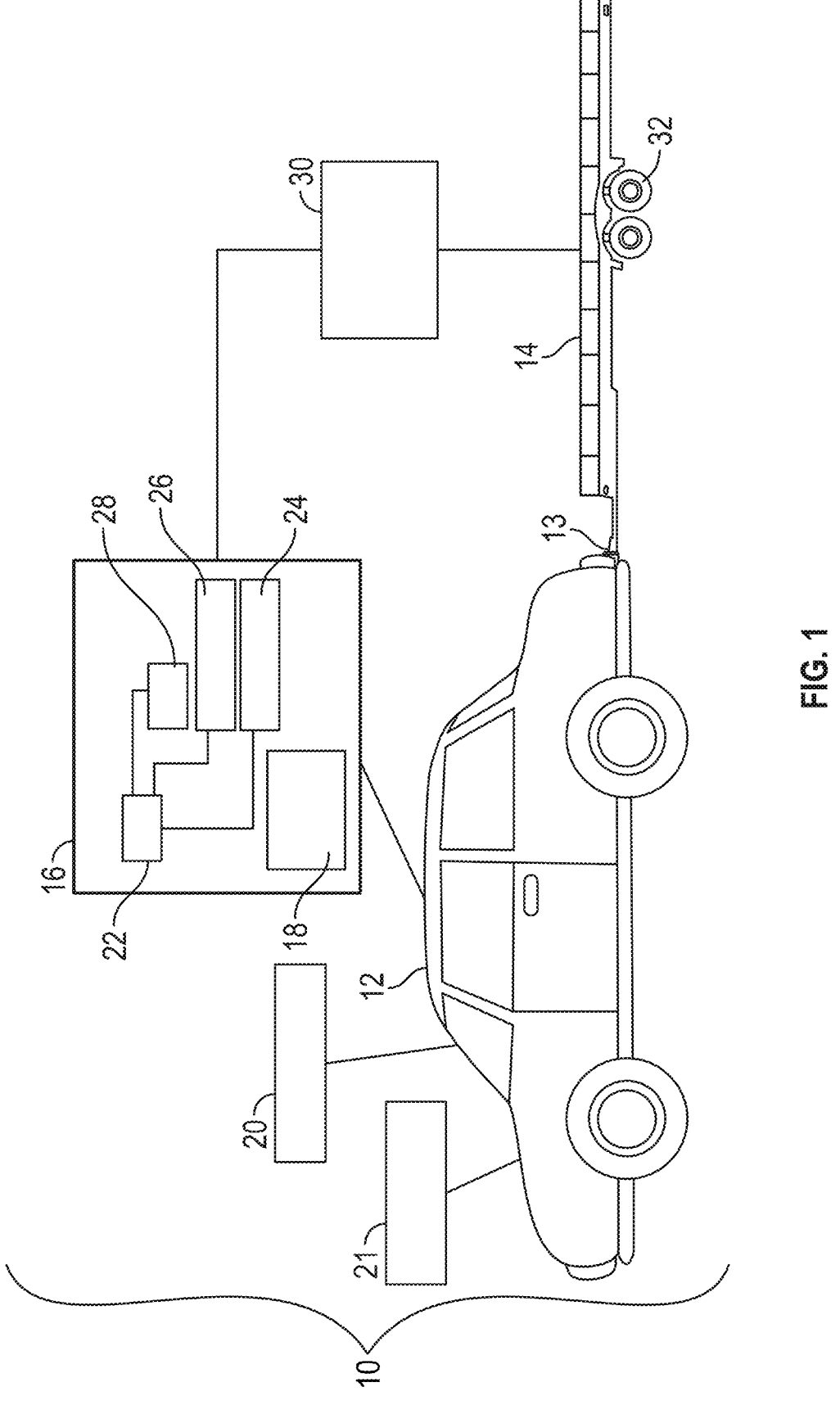
FIG. 1 is a schematic diagram of a system for determining an optimal trailer brake calibration for a trailer brake by a vehicle according to an exemplary embodiment.

Referring to FIG. 1, a schematic diagram of a system for determining an optimal trailer brake calibration for a trailer brake within a vehicle is generally indicated by reference number 10. The system 10 generally includes a vehicle 12 and a trailer 14.

The vehicle 12 is a land vehicle such as a car, truck, etc. that can be operated by a user or by an autonomous driving module. The vehicle 12 may have various levels of driving automation, including Level Five, Level Four, Level Three, and Level Two automation. For example, a Level Five system indicates "full automation," referring to the full-time performance by an automated driving system of aspects of the dynamic driving task under a number of roadway and environmental conditions that can be managed by a human driver. A Level Four system indicates "high automation," referring to the driving mode-specific performance by an automated driving system of aspects of the dynamic driving task, even if a human driver does not respond appropriately to a request to intervene. In Level Three vehicles, the vehicle systems perform the entire dynamic driving task (DDT) within the area that it is designed to do so. The vehicle operator is only expected to be responsible for the DDT-fallback when the vehicle 12 essentially "asks" the driver to take over if something goes wrong or the vehicle is about to leave the zone where it is able to operate. In Level Two vehicles, systems provide steering, brake/acceleration support, lane centering, and adaptive cruise control. However, even if these systems are activated, the vehicle operator at the wheel must be driving and constantly supervising the automated features. The vehicle 12 may include various actuator devices (not shown) used to achieve the above-described levels of automation. The actuator devices control one or more vehicle features including, but not limited to, a propulsion system, a transmission system, a steering system, and a brake system (not shown). In various embodiments, the vehicle features may further include interior and/or exterior vehicle features such as, but are not limited to, doors, a trunk, and cabin features such as air, music, lighting, etc. In the particular example provided in FIG. 1, the vehicle 12 includes a controller 16, a display 18, an accelerometer 20, and a speedometer 21.

The controller 16 is a non-generalized, electronic control device having a preprogrammed digital computer or processor 22, a memory 24, a transceiver 26, and a plurality of input and output ports 28. The processor 22 may be a custom made or commercially available processor, a central processing unit (CPU), a graphics processing unit (GPU), an auxiliary processor among several processors associated with the controller 16, a semiconductor-based microprocessor (in the form of a microchip or chip set), a microprocessor, a combination thereof, or generally a device for executing instructions. The memory 24 is used to store data such as control logic, software applications, instructions, computer code, data, lookup tables, etc. The memory 24 includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code. The processor 22 is configured to execute the code or instructions.

The controller 16 may further include one or more applications. The application is a software program configured to perform a specific function or set of functions. The applications may include one or more computer programs, software components, sets of instructions, procedures, functions, objects, classes, instances, related data, or a portion thereof adapted for implementation in a suitable computer readable program code. The applications may be stored within the memory 24 or in additional or separate memory. The controller 16 is in electrical communication with the trailer 14. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 16 are within the scope of the present disclosure.

The transceiver 26 is configured to wirelessly communicate with a hotspot using Wi-Fi protocols under IEEE 802.11x standards. The transceiver 26 is also configured to wirelessly communicate using cellular data communication under GSMA standards, such as SGP.02, SGP.22, SGP.32 and the like. Suitably, the vehicle 12 may further include an embedded universal integrated circuit card (eUICC) configured to store at least one cellular connectivity configuration profile, for example, an embedded subscriber identity module (eSIM) profile. The transceiver 26 is further configured to communicate via a personal area network (e.g., BLUETOOTH), near-field communication (NFC), and/or any additional type of radiofrequency communication.

The plurality of input and output ports 28 receive incoming data from the trailer 14 and communicates the incoming data to the processor 22. The plurality of input and output ports 28 also receive outgoing data from the processor 22 and communicate the outgoing data to the trailer 14. The plurality of input and output ports 28 are configured to wirelessly communicate with the trailer 14 via the transceiver 26 and are also configured to communicate with the trailer 14 through a Universal Serial Bus (USB) wired connection.

The display 18 is a screen or touchscreen that is located within the vehicle 12 that has a human-machine interface that presents data pertinent to the trailer 14. The display 18 allows the user to configure the vehicle 12, and run the applications included in the controller 16. The display 18 is an optional feature, meaning the display 18 is not required for the proper use or functionality of the vehicle 12 or any other part of the system 10.

The accelerometer 20 is used to provide data of an indication of a current acceleration of the vehicle 12. The accelerometer 20 is in communication with the controller 16. In non-limiting examples, the accelerometer 20 can be a piezoelectric accelerometer, a piezoresistive accelerometer, or a capacitive accelerometer. The current acceleration of the vehicle 12 is communicated to the processor 22.

The speedometer 21 is used to provide data of an indication of a current speed of the vehicle 12. In non-limiting examples, the speedometer 21 can be a mechanical speedometer that uses a magnetic field to induce the rotation of a speed cup to determine the vehicle's 12 speed or an electronic speedometer that uses pulse generation to determine the vehicle's 12 speed. The current speed of the vehicle 12 is then communicated to the processor 22.

The trailer 14 increases the cargo capacity of the vehicle 12 by providing space to store items. Typically, the trailer 14 is attached to the vehicle 12 by a trailer coupler 1. The trailer coupler 13 connects the trailer 14 to the vehicle 12 while allowing various degrees of rotation between the trailer 14 and the vehicle 12. The trailer coupler 13 may take many forms without departing from the scope of the present disclosure. For example, a hitch (not shown) may interface with a hitch ball (not shown) at a rear end of the vehicle 12. In addition, the trailer coupler can have several extra pins or locks (not shown) to further secure the trailer 14 ballot the vehicle 12. In a list of non-limiting examples, the trailer 14 may be one of several types of trailers, including an enclosed trailer, a utility trailer, a car hauler, an equipment trailer, a tow dolly, a gooseneck trailer, and a dump trailer. The trailer 14 includes a trailer brake 30 and wheels 32.

The trailer brake 30 assists the vehicle 12 and the trailer 14 in braking. The trailer brake 30 may be one of either an electric trailer brake or an electric over hydraulic (EOH) trailer brake. In the example where the trailer brake 30 is an electric trailer brake, the controller 16 sends an electrical signal to the trailer brake 30 when a driver presses a brake pedal within the vehicle 12. The electrical signal then travels to a plurality of brake drums that are situated within the wheels 32 of the trailer 14 via wiring within the trailer and energizes an electromagnet within each of the individual brake drums. The energizing of the electromagnet attracts the electromagnet to the face of each individual brake drum, causing a brake shoe situated within the brake drum to push against the brake drum, creating friction which slows the rotation of the wheels attached to the trailer 14. In the example where the trailer brake 30 is an electric over hydraulic trailer brake, the controller 16 sends an electrical signal to a hydraulic actuator when the driver presses the brake pedal within the vehicle 12. The hydraulic actuator then converts the electrical signal into hydraulic pressure, which is then transmitted through a plurality of brake lines to a plurality of brake assemblies situated on each wheel on the trailer 14. The hydraulic pressure pushes a plurality of brake pads against a plurality of rotors which are mounted on each wheel 32 on the trailer 14, creating friction which slows the rotation of the wheels 32 of the trailer 14. In another example, the hydraulic pressure pushes a plurality of brake shoes against a plurality of brake drums situated within the wheels 32 of the trailer 14, creating friction which slows the rotation of the wheels 32 of the trailer 14. In a non-limiting example, the controller 16 sends an electrical signal to the trailer brake 30 via wiring connecting the controller 16 and the trailer brake 30.

Figure 2:
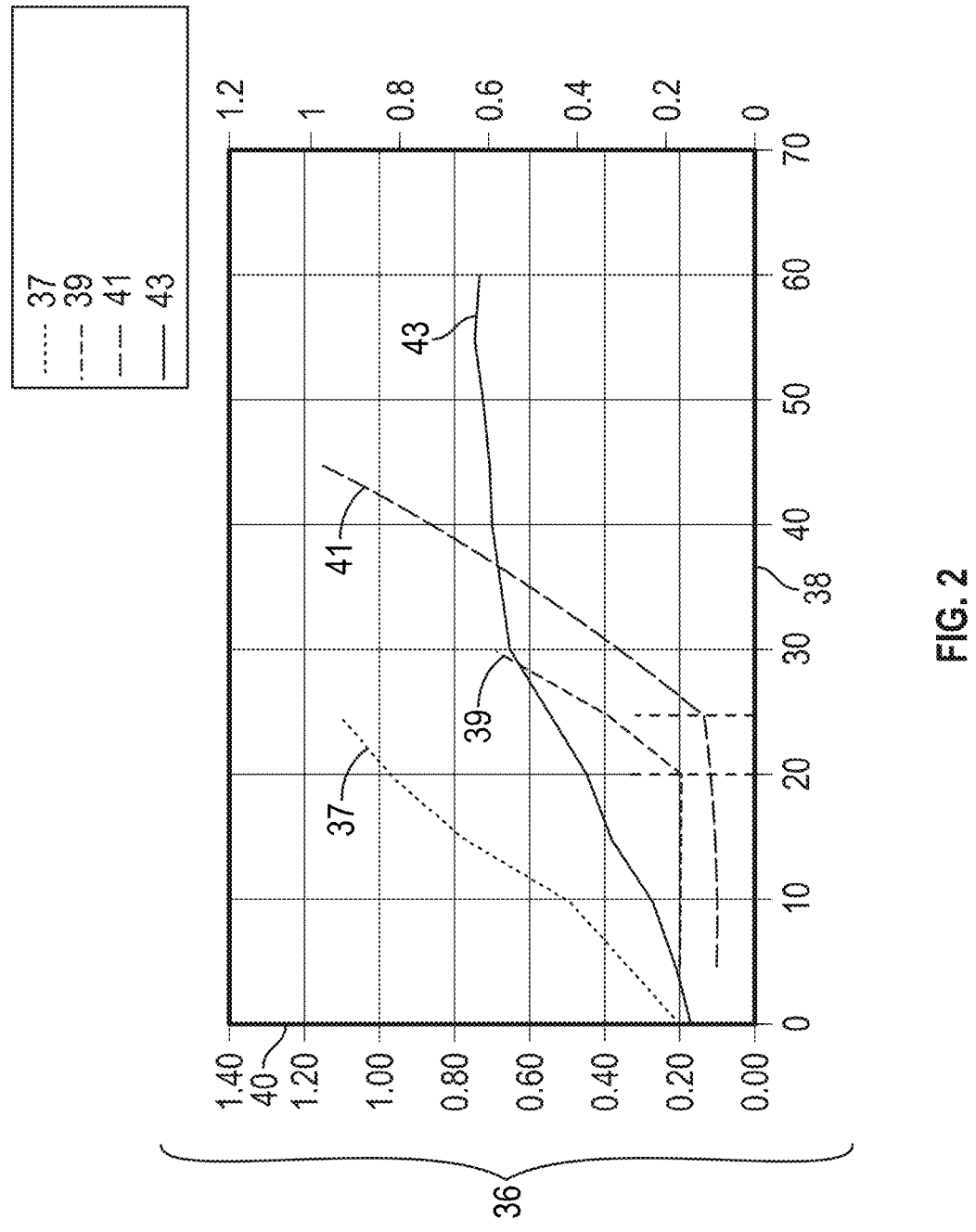
FIG. 2 is a graph of a minimum activation energy necessary to initiate the trailer brake according to an exemplary embodiment.

Referring to FIG. 2, an exemplary graph showing a minimum activation energy necessary to activate the trailer brake 30 is generally indicated by reference number 36. An x-axis of the graph 36 is a commanded activation energy 38 sent by the controller 16 to the trailer brake 30. A y-axis of the graph 36 is a deceleration 40 of the vehicle 12 and the trailer 14. A plurality of different types of trailer brakes 30 are plotted on the graph 36, including a first design 37, a second design 39, a third design 41, and fourth design 43. Each plot shows the vehicle 12 and the trailer 14 deceleration at a given commanded activation energy. In an example where the trailer brake 30 is an electric trailer brake, the commanded activation energy 38 may be the energy that is exerted on the electromagnet within the trailer brake 30 that creates the friction that slows down the trailer 14. In an example where the trailer brake 30 is an electric over hydraulic trailer brake, the commanded activation energy 38 may be the energy that exerts the hydraulic pressure that creates the friction that slows down the trailer 14.

The minimum activation energy is a threshold based on the minimum value of the commanded activation energy 38 that would initiate the trailer brake 30 and cause the vehicle 12 and the trailer 14 to decelerate. The first design 37 is an electric over hydraulic trailer brake with a minimum activation energy of zero. The second design 39 is an electric over hydraulic trailer brake with a minimum activation energy of 20. The third design 41 is an electric over hydraulic trailer brake with a minimum activation energy of 25. The fourth design 43 is an electric trailer brake with a minimum activation energy of zero. As can be seen in FIG. 2, the minimum activation energy may vary between different brake designs. In order to determine the minimum activation energy for a given brake design, the controller 16 initiates a brake pulse 42, shown in FIGS. 3A and 3B.

Figure 3A:
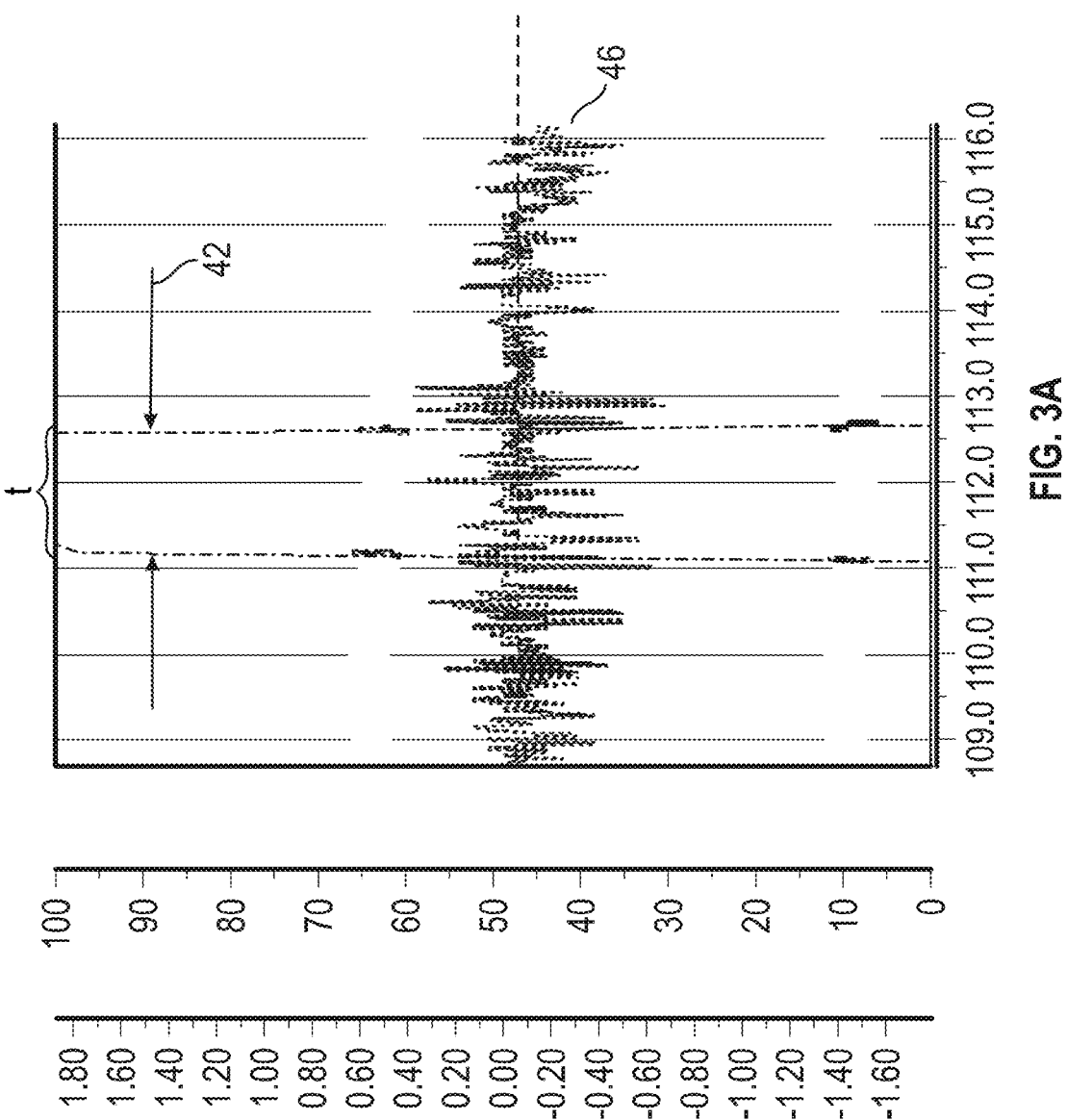
FIG. 3A is a graph of a brake pulse, a vehicle speed, and a vehicle deceleration when the minimum activation energy is not met according to an exemplary embodiment.

Referring to FIG. 3A, a graph of the brake pulse 42 and a vehicle deceleration 46 when the minimum activation energy is not met is generally indicated by reference number 48. An x-axis of the diagram 48 shows a period of time. A y-axis of the diagram 48 shows both the commanded activation energy 38 of the brake pulse 42 and the vehicle deceleration 46. The brake pulse 42 occurs over a calibrated amount of time t. The time t ranges between an arbitrary first period of time and an arbitrary second period of time. It should be noted that the first period of time and the second period of time when the trailer brake 30 is an electric over hydraulic trailer brake i longer on average compared to the first period of time and the second period of time when the trailer brake 30 is an electric trailer brake. The vehicle deceleration 46 is the deceleration of the vehicle 12 as measured by the accelerometer 20. In an example, when the minimum activation energy is not met by the commanded activation energy 38, when the brake pulse 42 occurs, the vehicle deceleration 46 is a coasting deceleration measured by the accelerometer 20. The coasting deceleration would be on average zero units per second squared over the duration of the brake pulse 42, as the trailer brake 30 is not initiated and is therefore not slowing the vehicle 12 down.

Figure 3B:
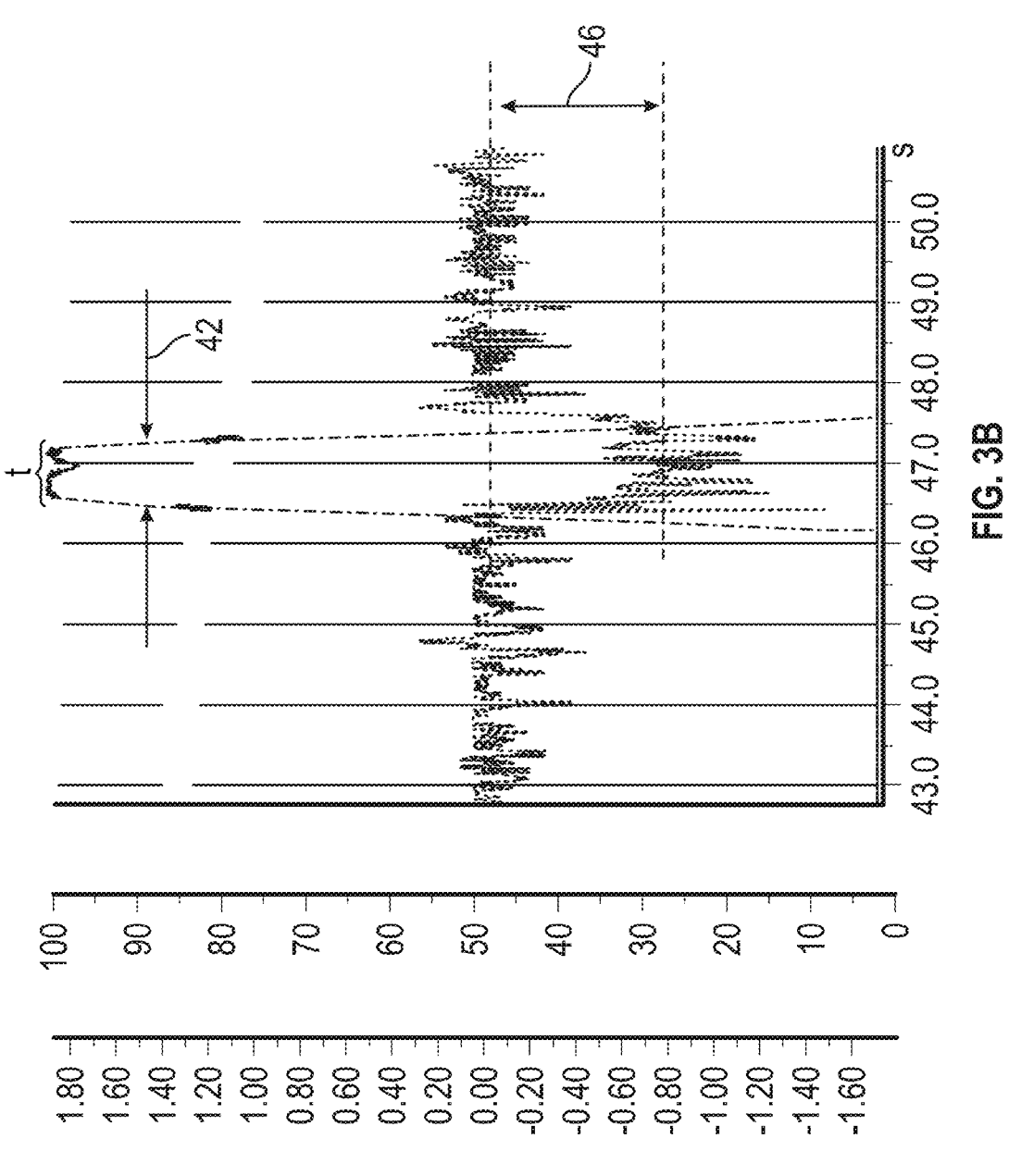
FIG. 3B is a graph of the brake pulse, the vehicle speed, and the vehicle deceleration when the minimum activation energy is met or exceeded according to an exemplary embodiment.

Referring to FIG. 3B, a diagram of the brake pulse 42 and the vehicle deceleration 46 when the minimum activation energy is met or exceeded is generally indicated by reference number 50. In an example, when the minimum activation energy is met or exceeded by the commanded activation energy 38, when the brake pulse 42 occurs, the vehicle deceleration 46 is a pulsing deceleration which is measured by the accelerometer 20. The pulsing deceleration would be on average greater than zero units per second squared over the duration of the brake pulse 42, as the trailer brake 30 is initiated and is therefore slowing the vehicle 12 down.

Figure 4:
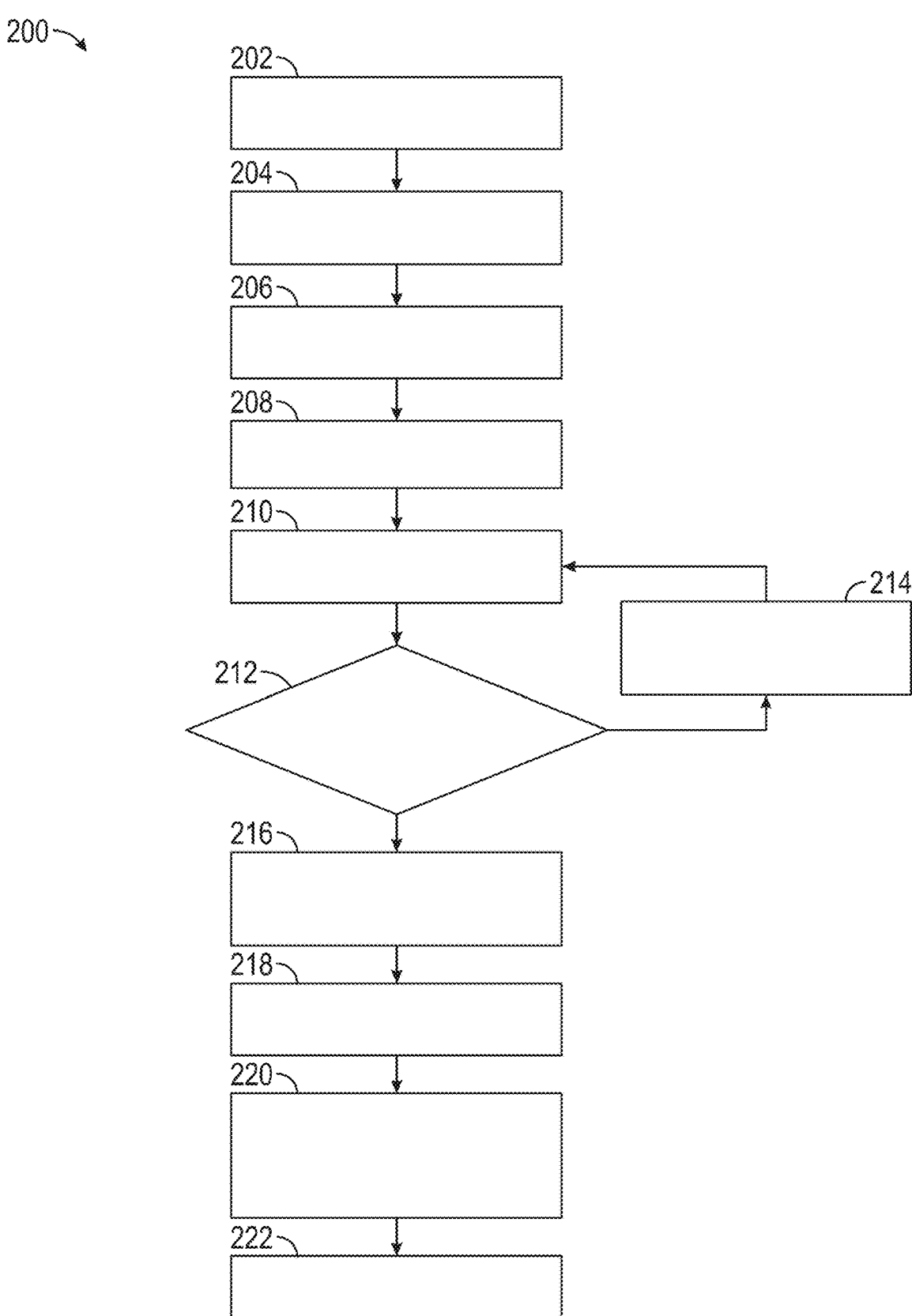
FIG. 4 is a flowchart of a method for determining the optimal trailer brake calibration for the trailer brake within the trailer according to an exemplary embodiment.

Referring to FIG. 4, a flowchart of a method for determining the optimal trailer brake calibration for the trailer brake 30 within the trailer 14 is generally indicated by reference number 200.

The method 200 beings at step 202 when a user of the system 10 activates the method for determining the optimal brake calibration. The user may activate the method by inputting a selection via the display 18. It should be appreciated that the method may be activated using other HMI systems in the vehicle 12. The method 200 then proceeds to step 204.

At step 204, the user of the vehicle 12 coasts the vehicle 12 at a recommended speed. Coasting of the vehicle 12 is initiated when a user of the vehicle 12 is neither pressing the gas pedal or the brake pedal within the vehicle 12. Alternatively, the coasting may be initiated by an advanced driver assistance system. The recommended speed is a speed of the vehicle 12 in which it is deemed safe to activate the system 10. The recommended speed is measured by the speedometer 21. The method 200 then proceeds to step 206.

At step 206, a coasting deceleration is measured. The coasting deceleration is the deceleration of the vehicle 12 when the user coasts the vehicle 12 at the recommended speed. The coasting deceleration is measured by the accelerometer 20. The method then proceeds to step 208.

At step 208, the controller 16 pulses the trailer brake 30, as described in FIGS. 3A and 3B. The brake pulse is at the commanded activation energy. During the brake pulse, the vehicle brakes are not activated. The method 200 then proceeds to step 210.

At step 210, the accelerometer 20 measures the pulsing deceleration of the vehicle 12 during the brake pulse 42 (shown in FIGS. 3A, 3B). The method 200 then proceeds to step 212.

At step 212 the coasting deceleration of the vehicle 12 is compared to the pulsing deceleration of the vehicle 12. When the pulsing deceleration is less than or equal to the coasting deceleration, the trailer brake 30 has not been activated and is not slowing the vehicle 12, and the method proceeds to step 214. In another embodiment, when the pulsing deceleration is greater than the coasting deceleration, the trailer brake 30 is activated and slowing the vehicle 12, and the method 200 proceeds to step 214.

At step 214 the commanded activation energy 38 of the trailer brake 30 is increased by a calibrated incremental amount. It should be appreciated that the commanded activation energy 38 i continually increased by the calibrated incremental amount until there is a measurable difference between the coasting deceleration and the pulsing deceleration. In the embodiment where the pulsing deceleration is greater than the coasting deceleration to initiate step 214, the commanded activation energy 38 is continually decreased by a calibrated decremental amount until there is no longer a measurable difference between the coasting deceleration and the pulsing deceleration. The method 200 then returns to step 212.

At step 216, the minimum activation energy of the trailer brake 30 is determined by discovering the commanded activation energy 38 where there is a measurable difference between the coasting deceleration and the pulsing deceleration. In the embodiment where the pulsing deceleration is greater than the coasting deceleration to initiate step 214, the minimum activation energy of the trailer brake 30 is determined by discovering the commanded activation energy 38 where there is no measurable difference between the coasting deceleration and the pulsing deceleration. The method 200 then proceeds to step 218.

At step 218 the type of the trailer brake 30 is determined by comparing the minimum activation energy to a plurality of known minimum activation energies for both electric and electric over hydraulic trailer brakes that are recorded in the memory 24. The plurality of known minimum activation energies is a list of already known minimum activation energies for various types of trailer brakes. It should be appreciated that the plurality of known minimum activation energies can be modified, and in non-limiting examples are modified by a user installing software via an optical storage device (e.g. digital versatile disks (DVDs), compact disks (CDs), Blu-ray, etc.), or a flash storage device (i.e. universal serial bus (USB) drives) that updates the plurality of known minimum activation energies in the memory 24, or by the controller 16 communicating with a network via the transceiver 26 to receive updated data with respect to the plurality of known minimum activation energies and recording that data in the memory 24. Each of the individual known minimum activation energy from the plurality of known minimum activation energies has an associated trailer brake type, being either an electric trailer brake or an electric over hydraulic trailer brake. When the minimum activation energy is matched to a known minimum activation energy from the plurality of known minimum activation energies, the type of the trailer brake 30 is determined to be the trailer brake type associated with the matched known minimum activation energy. The method 200 then proceeds to step 220.

At step 220 the minimum activation energy and the type of the trailer brake 30 are recorded in a trailer profile which is stored in a trailer profile database. The trailer profile associates the trailer 14 attached to the vehicle 12 with the minimum activation energy and the type of the trailer brake 30. This allows the user of the vehicle 12 to automatically set the configuration of the trailer brake 30 to the information stored within the trailer profile when the user is driving the vehicle 12 with the trailer 14 that the trailer profile is associated with. It should be appreciated that the configuration of the trailer brake 30 is accurate between two different durations of the operation of the vehicle 12 when the conditions of the driving environment are similar to the conditions when the minimum activation energy was determined according to the subjective opinion of the driver. It should be noted that the driver may want to reinitiate the system 10 despite the trailer 14 already having an associated trailer profile when the driver subjectively believes that the driving environment has changed relative to when the minimum activation energy was determined insofar that the change in driving environment could affect the minimum activation energy. The method then proceeds to step 222.

At step 222 an optimal trailer brake calibration is determined based on the minimum activation energy and the type of the trailer brake 30. The optimal trailer brake calibration is determined by inputting the minimum activation energy into a machine learning algorithm that further optimizes the minimum activation energy by considering the type of the trailer brake 30 and the attributes of the vehicle 12. A non-limiting list of attributes of the vehicle 12 include the type of the engine within the vehicle 12, the drivetrain of the vehicle 12, the transmission of the vehicle 12, the body style of the vehicle 12, the length, width, and height of the vehicle 12, and the weight of the vehicle 12. The method 200 then ends.

The system 10 of the present disclosure offers several advantages, including automatically identifying the type of the trailer brake 30, allowing the process of calibrating the trailer brake 30 to be automated on every subsequent use of the trailer 14. Another advantage of the system 10 is eliminating the delay between the activation of the trailer brake 30 and the deceleration of the vehicle 12, since the minimum activation energy of the trailer brake 30 can be recorded in the trailer profile and reused for every subsequent use of the trailer 14.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for determining an optimal trailer brake calibration for a trailer brake within a vehicle, the method comprising:

coasting the vehicle to a recommended speed;

measuring a coasting deceleration of the vehicle;

pulsing the trailer brake using a commanded activation energy;

measuring a pulsing deceleration of the vehicle;

comparing the coasting deceleration of the vehicle to the pulsing deceleration of the vehicle;

determining a minimum activation energy of the trailer brake by discovering the commanded activation energy when the pulsing deceleration is greater than the coasting deceleration;

identifying a trailer brake type of the trailer brake based on a plurality of known minimum activation energies; and determining an optimal trailer brake calibration based on the minimum activation energy.

2. The method from claim 1 wherein the recommended speed is a speed of the vehicle in which it is deemed safe to pulse the trailer brake.

3. The method from claim 1 wherein the coasting deceleration is the deceleration of the vehicle that is measured when the vehicle is coasting from a recommended speed and the trailer brake is not pulsed.

4. The method from claim 1 wherein pulsing the trailer brake further comprises pulsing the trailer brake at incremental levels of energy until the pulsing deceleration is greater than the coasting deceleration.

5. The method from claim 1 wherein the pulsing of the trailer brake is initiated by a controller within the vehicle.

6. The method from claim 1 wherein the pulsing deceleration is the deceleration of the vehicle that is measured when the trailer brake is pulsed.

7. The method from claim 1 wherein the commanded activation energy is the energy sent to the trailer brake and dictates the strength of the application of the trailer brake.

8. The method from claim 1 wherein the method further comprises increasing the commanded activation energy of the trailer brake when the pulsing deceleration of the vehicle is less than or equal to the coasting deceleration of the vehicle.

9. The method from claim 1 wherein increasing the commanded activation energy further comprises increasing an amount of energy sent to the trailer brake by a calibrated incremental margin.

10. The method from claim 1 wherein the minimum activation energy value is determined by discovering the value of the minimum commanded activation energy where the pulsing deceleration is greater than zero units per second squared.

11. The method from claim 1 wherein the optimal trailer brake calibration is based on the optimization of the minimum activation energy value by a machine learning algorithm.

12. The method from claim 1 wherein the type of the trailer brake type is identified by:

comparing the minimum activation energy to a plurality of known minimum activation energies;

discovering a known minimum activation energy from the plurality of known minimum activation energies that matches the minimum activation energy; and determining the type of the trailer brake is the type of trailer brake associated with the matched known minimum activation energy.

13. The method from claim 1 wherein the plurality of known minimum activation energies is a list of already known minimum activation energies for various types of trailer brakes.

14. The method from claim 1 wherein the optimal trailer brake calibration and the type of the trailer brake is recorded in a trailer brake profile.

15. A method for determining an optimal trailer brake calibration for a trailer brake within a vehicle, the method comprising:

coasting the vehicle to a recommended speed;

measuring a coasting deceleration of the vehicle;

pulsing the trailer brake using a commanded activation energy;

measuring a pulsing deceleration of the vehicle;

comparing the coasting deceleration of the vehicle to the pulsing deceleration of the vehicle;

determining a minimum activation energy value of the trailer brake by discovering the commanded activation energy when the pulsing deceleration is greater than the coasting deceleration;

identifying a trailer brake type of the trailer brake based on a plurality of known minimum activation energies;

recording the minimum activation energy value and the trailer brake type into a trailer profile; and determining an optimal trailer brake calibration based on the minimum activation energy.

16. The method from claim 15 wherein the method further comprises increasing the commanded activation energy of the trailer brake when the pulsing deceleration of the vehicle is less than or equal to the coasting deceleration of the vehicle.

17. The method from claim 15 wherein the plurality of known minimum activation energies is a list of already known minimum activation energies for various types of trailer brakes.

18. The method from claim 15 wherein the trailer profile is recorded in a trailer profile database containing a plurality of trailer profiles.

19. The method from claim 15 wherein the optimal trailer brake calibration is automatically set when a driver selects the trailer profile when operating the vehicle.

20. A method for determining an optimal trailer brake calibration for a trailer brake within a vehicle, the method comprising:

coasting the vehicle to a recommended speed;

measuring a coasting deceleration of the vehicle;

pulsing the trailer brake using a commanded activation energy;

measuring a pulsing deceleration of the vehicle;

comparing the coasting deceleration of the vehicle to the pulsing deceleration of the vehicle;

increasing the commanded activation energy of the trailer brake when the pulsing deceleration of the vehicle is less than or equal to the coasting deceleration of the vehicle;

determining a minimum activation energy value of the trailer brake by discovering the commanded activation energy when the pulsing deceleration is greater than the coasting deceleration;

identifying a trailer brake type of the trailer brake based on a plurality of known minimum activation energies;

recording the minimum activation energy value and the trailer brake type into a trailer profile; and determining an optimal trailer brake calibration based on the minimum activation energy.

* * * * *